United States Patent [19]

Koopman, Jr. et al.

[11] Patent Number: 5,398,284
[45] Date of Patent: Mar. 14, 1995

[54] CRYPTOGRAPHIC ENCODING PROCESS

[75] Inventors: Philip J. Koopman, Jr., Hebron; Alan M. Finn, Amston, both of Conn.

[73] Assignee: United Technologies Automotive, Inc., Dearborn, Mich.

[21] Appl. No.: 148,667

[22] Filed: Nov. 5, 1993

[51] Int. Cl.6 .......................... H04K 1/00; H04L 9/00
[52] U.S. Cl. .................................... 380/28; 380/4; 380/49; 380/50
[58] Field of Search ................... 380/28, 4, 49, 50, 30, 380/29, 37

[56] References Cited

U.S. PATENT DOCUMENTS

| | | | |
|---|---|---|---|
| 4,322,577 | 3/1982 | Brandstrom | 380/28 |
| 4,424,414 | 1/1984 | Hellman et al. | |
| 4,771,463 | 9/1988 | Beeman | 380/46 |
| 4,797,921 | 1/1989 | Shiraishi | 380/28 |
| 4,876,718 | 10/1989 | Citta et al. | |
| 5,136,642 | 8/1992 | Kawamura et al. | 380/21 |
| 5,146,215 | 9/1992 | Drori | |
| 5,191,610 | 3/1993 | Hill et al. | |
| 5,220,606 | 6/1993 | Greenberg | 380/28 |
| 5,231,667 | 7/1993 | Kojima | 380/28 |
| 5,272,755 | 12/1993 | Miyaji et al. | 380/30 |
| 5,313,530 | 5/1994 | Iwamura | 380/28 |
| 5,317,639 | 5/1994 | Mittenthal | 380/37 |
| 5,321,752 | 6/1994 | Iwamura et al. | 380/24 |

*Primary Examiner*—David C. Cain
*Attorney, Agent, or Firm*—Harness, Dickey & Pierce

[57] ABSTRACT

The digital information is encrypted by first performing a preselected number of CRC iterations or partial convolutions by multiplication with a mask in the Galois Field. Before the CRC operation is completed, the intermediate resultant is subjected to an Integer Ring operation, such as addition, which injects a nonlinearity over the Galois Field due to possible arithmetic carry operations. After the Integer Ring operation, the Galois Field CRC process is continued to completion. The result is an encrypted value which is not readily decrypted by Galois Field techniques.

10 Claims, 1 Drawing Sheet

CRYPTOGRAPHIC ENCODING PROCESS

BACKGROUND AND SUMMARY OF THE INVENTION

The present invention relates generally to cryptography, and in particular to a method of encrypting digital information rendering it more difficult to decipher using computer-assisted techniques. Although the invention is applicable to a wide range of applications, it finds particular utility in an encryption system for keyless entry locks, such as keyless entry locks for automotive applications.

Cyclic redundancy code (CRC) processes have been used in cryptographic systems for remote keyless entry of vehicles and other applications. A conventional CRC process can be analyzed using Galois Field theory. While the decrypting of CRC processes is beyond the skill of most persons, CRC encryption schemes can be readily broken by persons who have an understanding of Galois Field theory. Persons with such an understanding could, for example, program a computer in accordance with this theory to decrypt the encrypted digital information by reversing the CRC process.

The present invention utilizes an improved method of encrypting digital information in a way which renders conventional Galois Field theory and computerized decryption analysis virtually useless. The improved encryption method can be implemented to greatly complicate the analysis required to decrypt the digital information, thereby greatly increasing the resistance to cryptographic attack. The method can be implemented at virtually no additional cost and it can be added by retrofit to an existing encryption system, requiring as little as one additional processor clock cycle.

According to the improved method a real field operation or integer ring operation (e.g. an add with carry operation) is introduced or interposed into the middle of the CRC process. While the CRC process may be readily represented using a Galois Field analysis, the Integer Ring operation does not readily translate into a Galois Field paradigm. Thus, without a priori knowledge of where in the CRC cycle the Integer Ring operation was performed and further without a priori knowledge of the precise nature of the Integer Field operation, it is virtually impossible to use conventional Galois Field theory to decrypt the digital information.

According to one aspect of the invention a method of encrypting an digital information is provided whereby a mask is selected and this mask and the digital information are represented each as a predetermined number of bits in the Galois Field. A multiplication in the Galois Field GF($2^n$), equivalent to a polynomial convolution operation, between the digital information, and the mask is then commenced by multiplying and adding the Galois Field GF(2) a first portion of the bits of the digital information, with a first portion of the bits of the mask to obtain a first resultant.

The convolution operation is then temporarily halted after a predetermined number of multiplications. Next an offset integer of a predetermined number of bits is selected and this integer, along with the first resultant are represented in the Integer Ring, whereupon an Integer Ring operation between the first resultant and the offset integer are performed to obtain a second resultant. The second resultant is then substituted for the first resultant and the second resultant and mask are then again represented in the Galois Field and the convolution operation is resumed, using the second resultant in place of the first. The convolution operation is resumed by multiplying and adding the Galois Field the remaining portion of the bits of the second resultant with the remaining portion of the bits of the mask to obtain an encrypted digital information.

For a more complete understanding of the invention, its objects and advantages, reference may be had to the following specification and to the accompanying drawing.

DESCRIPTION OF THE PREFERRED EMBODIMENT

The encryption method of the invention uses a cyclic redundancy code (CRC) to scramble the bits of a message of digital information. As noted above, conventional CRC processes provide comparatively weak encryption. This is because a CRC process can be expressed as a linear operation over a Galois Field, and linear operations are inherently easier to analyze than nonlinear operations.

The present invention introduces nonlinearities into the CRC,process by performing an operation over the Real Field or Integer Ring, in the middle of the CRC process. As used herein the terms Real Field and Integer Ring are used essentially synonymously. As will be explained, this technique introduces significant complexity, making cryptographic analysis far more difficult. The inclusion of an Integer Ring operation, such as Integer Field addition, superimposes a supplemental encryption function over and above the basic CRC process. This, in effect, gives two simultaneous levels of encryption or scrambling, essentially for the price of one.

The present invention can be implemented to operate on digital information comprising any desired number of bits. For example, in a keyless entry system a 32 bit CRC process (with a secret feedback polynomial) may be used to scramble a 32 bit piece of digital information such as an access code. The CRC process is equivalent to multiplication in a Galois Field GF($2^n$). The CRC can be computed as 32 iterations of a shift and exclusive OR with mask operation.

Figure 1:
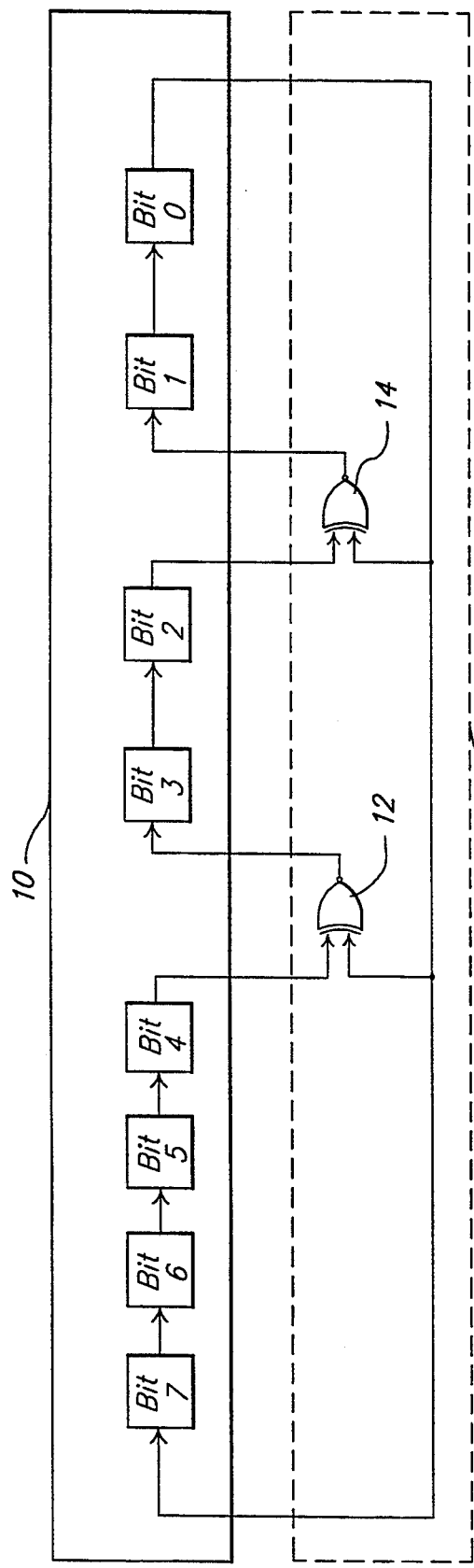
FIG. 1 is a block diagram illustrating an example of a linear feedback shift register (LFSR), useful in understand the principles of the invention.

To illustrate the principle, an 8 bit CRC process will be illustrated. It will, of course, be understood that the invention is not restricted to any bit size number. Referring to FIG. 1, the individual bits residing in register 10 have been designated in the boxes labeled bit 0–bit 7 consecutively. In general, register 10 is configured to cycle from left to right so that bit 7 shifts right to supply the input to bit 6, bit 6 to bit 5, and so forth (with the exception of those bits involved in the exclusive OR operations). As illustrated, bit 0 shifts back to bit 7, thereby forming a cycle or loop.

In addition to the shift operation, the digital information in register 10 is also subjected to one or more exclusive OR operations. In FIG. 1, exclusive OR operations 12 and 14 have been illustrated. Exclusive OR operation 12 receives one of its inputs from bit 4 and the other of its inputs from bit 0. Exclusive OR 12 provides its output to bit 3. Similarly, exclusive OR 14 receives its inputs from bit 2 and bit 0 and provides its output to bit 1. The two exclusive OR operations illustrated in FIG. 1 are intended to be merely exemplary, since, in general, any number of exclusive OR operations may be used, ranging from none up to the number of digits in the register (in this case 8). Also, the exclusive OR operations may be positioned between any two adjacent bits, in any combination. Thus, the positioning of exclusive OR operations between bits 3 and 4 and between bits 1 and 2 as shown in FIG. 1 is merely an example.

The exclusive OR operations selected for a given encryption may be viewed as a mask wherein the bits of the mask are designated either 1 or 0, depending on whether an exclusive OR operation is present or not present. Thus, in FIG. 1, the mask may be designated generally at 16.

Table I illustrates the shift register bit patterns for the register and mask combination of FIG. 1. The Table lists at the top an exemplary initial bit pattern (to represent an exemplary byte or word of digital information), followed by the resulting bit patterns for each of 8 successive iterations or cycles.

Table I depicts all of the possible successive bit patterns for the circuit of FIG. 1. Because the exclusive OR gates of FIG. 1 do not correspond to a primitive polynomial, the circuit is not a maximal length feedback shift register. That it is not maximal length is obvious by inspection of Table I. Each separate column of binary numbers represents successive steps of the circuit of FIG. 1. A shift of the last number in a column (equivalently a cycle) produces the number at the top of the column. There are 20 different cycles of length between 2 and 14.

TABLE I

| | | | | | | |
|---|---|---|---|---|---|---|
| 00000001 | 00000011 | 00000101 | 00000111 | 00001001 | 00001011 | 00001101 |
| 10001010 | 10001011 | 10001110 | 10001001 | 10001110 | 10001111 | 10001100 |
| 01000101 | 11001111 | 01000100 | 11001110 | 01000111 | 11001101 | 01000110 |
| 10101000 | 11101101 | 00100010 | 01100111 | 10101001 | 11101100 | 00100011 |
| 01010100 | 11111100 | 00010001 | 10111001 | 11011110 | 01110110 | 10011011 |
| 00101010 | 01111110 | 10000010 | 11010110 | 01101111 | 00111011 | 11000111 |
| 00010101 | 00111111 | 01000001 | 01101011 | 10111101 | 10010111 | 11101001 |
| 10000000 | 10010101 | 10101010 | 10111111 | 11010100 | 11000001 | 11111110 |
| 01000000 | 11000000 | 01010101 | 11010101 | 01101010 | 11101010 | 01111111 |
| 00100000 | 01100000 | 10101000 | 11100000 | 00110101 | 01110101 | 10110101 |
| 00010000 | 00110000 | 01010000 | 01110000 | 10010000 | 10110000 | 11010000 |
| 00001000 | 00011000 | 00101000 | 00111000 | 01001000 | 01011000 | 01101000 |
| 00000100 | 00001100 | 00010100 | 00011100 | 00100100 | 00101100 | 00110100 |
| 00000010 | 00000110 | 00001010 | 00001110 | 00010010 | 00010110 | 00011010 |
| 00001111 | 00010011 | 00010111 | 00011001 | 00011011 | 00011101 | 00100111 |
| 10001101 | 10000011 | 10000001 | 10000110 | 10000111 | 10000100 | 10011001 |
| 11001100 | 11001011 | 11001010 | 01000011 | 11001001 | 01000010 | 11000110 |
| 01100110 | 11101111 | 01100101 | 10101011 | 11101110 | 00100001 | 01100011 |
| 00110011 | 11111101 | 10111000 | 11011111 | 01110111 | 10011010 | 10111011 |
| 10010011 | 11110100 | 01011100 | 11100101 | 10110001 | 01001101 | 11010111 |
| 11000011 | 01111010 | 00101110 | 11111000 | 11010010 | 10101100 | 11100001 |
| 11101011 | 00111101 | | 01111100 | 01101001 | 01010110 | 11111010 |
| 11111111 | 10010100 | | 00111110 | 10111110 | 00101011 | 01111101 |
| 11110101 | 01001010 | | 00011111 | 01011111 | 10011111 | 10110100 |
| 11110000 | 00100101 | | 10000101 | 10100101 | 11000101 | 01011010 |
| 01111000 | 10011000 | | 11001000 | 11011000 | 11101000 | 00101101 |
| 00111100 | 01001100 | | 01100100 | 01101100 | 01110100 | 10011100 |
| 00011110 | 00100110 | | 00110010 | 00110110 | 00111010 | 01001110 |
| 00101001 | 00101111 | 00111001 | 01010001 | 01010011 | 01011011 | |
| 10011110 | 10011101 | 10010110 | 10100010 | 10100011 | 10100111 | |
| 01001111 | 11000100 | 01001011 | | 11011011 | 11011001 | |
| 10101101 | 01100010 | 10101111 | | 11100111 | 11100110 | |
| 11011100 | 00110001 | 11011101 | | 11111001 | 01110011 | |
| 01101110 | 10010010 | 11100100 | | 11110110 | 10110011 | |
| 00110111 | 01001001 | 01110010 | | 01111011 | 11010011 | |
| 10010001 | 10101110 | | | 10110111 | 11100011 | |
| 11000010 | 01010111 | | | 11010001 | 11111011 | |
| 01100001 | 10100001 | | | 11100010 | 11110111 | |
| 10111010 | 11011010 | | | 01110001 | 11110001 | |
| 01011101 | 01101101 | | | 10110010 | 11110010 | |
| 10100100 | 10111100 | | | 01011001 | 01111001 | |
| 01010010 | 01011110 | | | 10100110 | 10110110 | |

The bitwise shifting and exclusive OR operations provided by the CRC process can be viewed as a multiplication operation between the register and mask in the Galois Field $GF(2^n)$. This operation is, in effect, a convolution operation in which the register bit pattern representing the digital information to be encrypted is convolved with or folded into the bit pattern of the mask.

Figure 2:
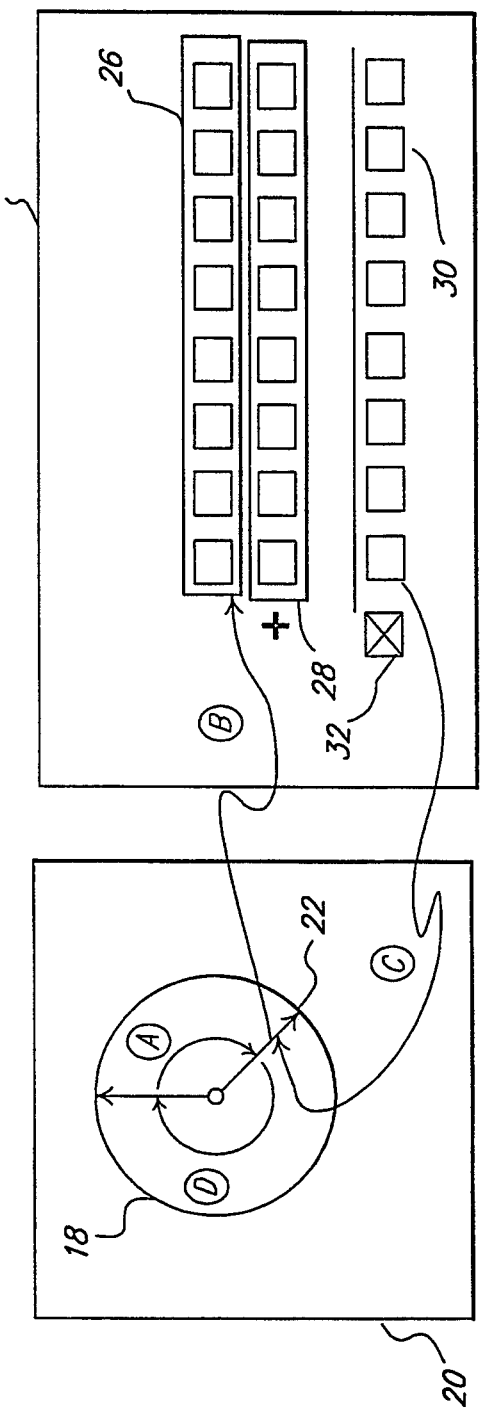
FIG. 2 is a schematic diagram illustrating the method by which digital information is encyrpted utilizing processing steps in both the Galois Field and the Integer Ring.

Rather than performing the shifting and exclusive OR operations through a full cycle, as demonstrated by Table I, the present invention suspends or temporarily halts the convolution operation after a predetermined number of multiplications or iterations. The number of iterations performed before the CRC convolution process is suspended can be treated as a secret number or key to be used in later decrypting the resultant. In FIG. 2 the CRC convolution process is illustrated diagrammatically by circle 18. For illustration purposes, one complete cycle of n iterations (n being the number of bits in the register in this example is diagrammatically depicted by a full rotation of 360° within circle 18. Thus during a first portion of the convolution process depicted by arc A the CRC process proceeds from its starting point at the twelve o'clock position to the suspension point (in this case at the five o'clock position). The point at which suspension occurs is arbitrary, since suspension can occur at any selected point within the full convolution cycle.

While the convolution process is occurring, as depicted by circle 18, the operations can be considered as taking place in or being represented in the Galois Field, designated generally by region 20. However, when the suspension point is reached, as at 22, the Galois Field processes are suspended and further processing occurs in the Integer Ring 24. While in the Integer Ring the intermediate resultant of previous Galois Field operations (multiplications) are operated on by a Real Field or Integer Ring process. In FIG. 2, the intermediate resultant value is depicted generally by bit pattern 26. In the presently preferred embodiment bit pattern 26 is arithmetically added with a predetermined number or bit pattern 28, with the resulting sum depicted at 30.

One characteristic of the Integer Ring operation is that a carry operation may or may not occur, depending on the value of the digits being added. That is, if digits 0+0 are added, no carry occurs, whereas if digits 1+1 are added, a carry is generated. Any carry from the most significant digit is ignored, as illustrated at 32.

After the Integer Ring operation has completed, the resultant sum is transferred back to the Galois Field as indicated by arrow C, whereupon the remainder of the CRC operation is carried out as indicated by arc D.

It will be appreciated that the options for altering the simple CRC process are numerous. The precise point at which the CRC process is suspended and the resultant transferred to the Integer Ring can be after any preselected number of iterations (the preselected number being optionally a secret number or key). In addition, the number or bit pattern 28 added while in the Real Field or Integer Ring can also be any secret number, serving as an additional key. Because carries may occur between bits of the intermediate value during the addition step in the Integer Ring, the process is nonlinear with respect to the Galois Field over which the CRC process is being performed. It will be seen that the process thus described is extremely inexpensive to implement, since it only requires one or a few additional program instructions to accomplish and may be effected in as short as a single clock cycle.

The improved encryption resulting from the above-described process may be used as a new fundamental cryptographic building block which can be combined to form a part of a more complex encryption/decryption process. For example, more than one Integer Ring operation could be performed during the CRC process to further complicate any decryption analysis. Similarly, any single or combination of information-preserving, reversible operations over the Integer Ring (e.g. addition, subtraction) can be used during the CRC. The key to effectiveness is that the Integer Ring operation must produce the possibility of inter-bit arithmetic carries, which are inherently poorly expressed by Galois Field analysis. Similarly any combination of two or more information-preserving, reversible operations over different mathematical structures, such as Groups, Rings or Fields, can be used. The key to effectiveness is that the operation in one mathemtaical structure is inherently poorly represented in one or more of the other structures.

The invention may be implemented in software. In this regard, a C code listing for both the CRC and the reverse CRC (decoding) process is attached in the Appendix. In the code set forth in the Appendix the offset integer (value 28 in FIG. 2) is referred to as the "twiddle factor."

By way of further explanation of the principles of the invention, the following analysis may be helpful. The CRC of $p(x)$ of order n using polynomial $g(x)$ is equivalent to taking the remainder of $x^n p(x)$ divided by $g(x)$ where all the polynomial coefficients are zero or one, binary addition is an XOR operation, and binary multiplication is an AND operation. This is denoted $$R_{g(x)}[x^n p(x)] \tag{1}$$

where all operations are understood to be performed over the Galois Field GF(2).

The binary representation of the CRC process after the $k^{th}$ step will be called a, where $$\sum_{i=0}^{n-1} a_i 2^i = R_{g(x)}[x^k p(x)], \tag{2}$$

and each of the $a_i$ are zero or one.

Adding a binary number (the twiddle factor), b, to a over the integers gives c $$\sum_{i=0}^{n} c_i 2^i = \sum_{i=0}^{n-1} a_i 2^i \sum_{i=0}^{n-1} b_i 2^i \tag{3}$$

where, in general, $c_i \neq a_i + b_i$ due to carries from lower-order bits.

The effect of adding a twiddle factor may be assessed by determining the Galois Field operation equivalent to the integer operation. That is, determine the polynomial $q(x)$ must be added to $p(x)$ such that $$\sum_{i=0}^{n-1} c_i 2^i = R_{g(x)} [x^k (p(x) + q(x))], \tag{4}$$

where the operations are performed over GF(2).

Even if the twiddle factor b is a constant, the resulting bit pattern c is dependent on the values of a and k see Equation (3). Since there are no carries in Galois Field arithmetic, the equivalent polynomial $q(x)$ is also dependent on the values of a and k, i.e., it is not a constant. The polynomial $q(x)$ is a nonlinear encoding of $p(x)$. It appears, in effect, to be another pseudo-random number and further increases the security of the CRC process.

From the foregoing it will be understood that the invention provides a easily implemented, but highly effective technique for encrypting digital information so that conventional Galois Field analysis cannot be readily used to decrypt the information. While the invention has been described in its presently preferred form, it will be understood that the invention is capable of modification without departing from the spirit of the invention as set forth in the appended claims.

APPENDIX

```
void CRC(BYTE *val, BYTE *feed. BYTE twiddle)
{short i,j,flag; int cy;
...
/* Perform iterations of a CRC process */
for (j = 0: j CRC_BITS; j++)
{/* Shift right & feedback. Note that feedback term MUST
 * have the bit after the top bit set -- this gives a
 * rotate function even though the field isn't an even-
 * byte length. (because the top feedback bit will
 * always be XORed into a 0-bit value, that top bit having
 * just been vacated by the preceedign ROR_C) */
```

APPENDIX-continued

```
flag = val[0] & 1; cy = 0;
for (i = (CRC_BYTES) - 1; i = 0; i--)
{ROR_C(val[i], cy);
if (flag) val[i] = val[i] ∧ feed[i];
}
if (i == TWIDDLE_ITER)
{/* Add in twiddle factor byte-wise (easy-to express in C) /*
/* Could also do it as a large add-with-carry across all bytes */
for (i=(CRC_BYTES)-2: i = 0; i--) val[i]=val[i]+twiddle[i];
}
}
...
}
void reverse_CRC(BYTE *val, BYTE *feed, BYTE twiddle)
{short i,j,flag; int cy;
...
/* Perform iterations of a reverse CRC process */
for (j = 0; j CRC_BITS ; j++)
{/* compute cy-in bit from current highest bit */
flag = cy = val[CRC_BYTES-1] & CRC_TOP_BIT;
/* Shift left & feedback. Note that this is the same
 * feedback value as the forward CRC process, but the
 * opposite shifting direction (the alternative is to use
 * the inverse polynomial and shift the same way -- but
 * that would complicate downloading the feedback terms
 * from the transmitter to the receiver). */
if (j == (CRC_BITS-TWIDDLE_ITER-1) )
{/* subtract out twiddle factor byte-wise */
for (i = 0; i CRC_BYTES-1; i++) val[i] = val[i] − twiddle[i];
}
for (i = 0; i CRC_BYTES; i++)
{if (flag) val[i] = val[i] ∧ feed[i];
ROL_C(val[i], cy);
}
}
...
}
```

What is claimed is:

1. A method of encrypting digital information comprising a first predetermined number of bits, comprising:

selecting a mask comprising a second predetermined number of bits;

representing the digital information and the mask in a Galois field and commencing a convolution operation of the digital information with the mask by multiplying and adding in the Galois field a first portion of the first predetermined number of bits with a first portion of the second predetermined number of bits to obtain a first resultant;

temporarily halting said convolution operation after a predetermined number of intermediate steps or shifts;

selecting an offset integer of a third predetermined number of bits;

representing the first resultant and the offset integer in the integer ring and performing an integer ring operation between the first resultant and said offset integer to obtain a second resultant of the first predetermined number of bits;

substituting said second resultant for said first resultant;

representing the second resultant and the mask in the Galois field and resuming said convolution operation using said second resultant in place of said first resultant by multiplying and adding in the Galois field the remaining portion of the first predetermined number of bits of the second resultant with the remaining portion of the second predetermined number of bits of the mask to obtain encrypted digital information.

2. The method of claim 1 wherein said digital information is an access code.

3. The method of claim 1 wherein said integer ring operation is an integer addition operation.

4. The method of claim 1 wherein said integer ring operation includes a carry operation.

5. The method of claim 1 wherein said integer ring operation alters the bits of the first resultant field in a data-dependent manner.

6. The method of claim 1 wherein said convolution operation is performed using a cyclic redundancy code process.

7. The method of claim 1 further comprising selecting a first value; using said first value to determine said predetermined number of intermediate steps or shifts and providing said first value as a key to decrypt said encrypted digital information.

8. The method of claim 1 further comprising selecting a first value; using said first value in performing said integer ring operation and providing said first value as a key to decrypt said encrypted digital information.

9. The method of claim 1 wherein said integer ring operation is an integer addition operation and wherein said offset integer comprises a fewer number of bits than said first resultant.

10. The method of claim 1 wherein said integer ring operation is an integer addition operation and wherein any carry bit resulting from such addition is ignored.

* * * * *

UNITED STATES PATENT AND TRADEMARK OFFICE
CERTIFICATE OF CORRECTION

PATENT NO. : 5,398,284
DATED : March 14, 1995
INVENTOR(S) : Philip J. Koopman, Jr. et al It is certified that error appears in the above-indentified patent and that said Letters Patent is hereby corrected as shown below:

Column 1, line 49, delete "an";

Column 2, line 15, "understand" should be --understanding--;

Column 2, line 33, delete ",";

Column 4, line 53, delete ".";

Column 4, line 62, after "register", insert --)--;

Column 6, line 19, "$a_1$" should be --$a_i$--;

Column 6, line 25, after "$a_i 2^i$", insert --+--;

Column 6, line 50, "a" should be --an--;

Column 6, line 60, "feed." should be --feed,--;

Column 6, line 63, "O:" should be --O;--;

Column 6, line 68, "precedign" should be --preceding--

Column 7, line 6, "if i" should be --if j--;

Column 7, line 10, "2: should be --2;--

UNITED STATES PATENT AND TRADEMARK OFFICE
CERTIFICATE OF CORRECTION

PATENT NO. : 5,398,284
DATED : March 14, 1995
INVENTOR(S) : Philip J. Koopman, Jr. et al It is certified that error appears in the above-indentified patent and that said Letters Patent is hereby corrected as shown below:

Column 8, line 49, claim 10, "such" should be --said--.

Signed and Sealed this

First Day of August, 1995

Attest:

BRUCE LEHMAN

Attesting Officer
Commissioner of Patents and Trademarks